(12) United States Patent
Uchida

(10) Patent No.: US 12,073,128 B2
(45) Date of Patent: Aug. 27, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Tatsuro Uchida, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/047,612

(22) Filed: Oct. 18, 2022

(65) Prior Publication Data
US 2023/0127010 A1   Apr. 27, 2023

(30) Foreign Application Priority Data
Oct. 22, 2021   (JP) .............................. 2021-172950

(51) Int. Cl.
*G06F 3/12*   (2006.01)

(52) U.S. Cl.
CPC .......... *G06F 3/1208* (2013.01); *G06F 3/1258* (2013.01); *G06F 3/1264* (2013.01)

(58) Field of Classification Search
CPC .... G06F 3/1208; G06F 3/1258; G06F 3/1264; G06F 3/1204; G06F 3/1205; G06F 3/1256; G06F 3/1285
See application file for complete search history.

(56) References Cited

U.S. PATENT DOCUMENTS

| | | | | |
|---|---|---|---|---|
| 7,316,085 B1* | 1/2008 | Freeman | .................. | G09F 1/06 40/454 |
| 2012/0316664 A1* | 12/2012 | Beier | ..................... | B65H 45/28 700/97 |
| 2012/0327463 A1* | 12/2012 | Mizuno | ................. | G06F 3/1288 358/1.15 |
| 2013/0185673 A1* | 7/2013 | Cai | ..................... | G06F 3/04815 715/781 |
| 2018/0181043 A1* | 6/2018 | Ooba | ................. | G03G 15/6582 |
| 2020/0097235 A1* | 3/2020 | Niiyama | ............... | G06F 3/1208 |

FOREIGN PATENT DOCUMENTS

JP   2019081318 A   5/2019

* cited by examiner

*Primary Examiner* — Akwasi M Sarpong
*Assistant Examiner* — Michael L Burleson
(74) *Attorney, Agent, or Firm* — CANON U.S.A., INC. IP Division

(57) ABSTRACT

A preview processing unit obtains a print setting and rendering data, generates a preview image for print from the rendering data of a corresponding page, and displays the generated preview image on a preview screen. In a case where the print setting includes a crease setting, the preview processing unit displays, in a superimposed manner on the preview image, an object indicating a position at which a cease is to be applied. In a case where the print setting includes a perforation setting, the preview processing unit displays, in a superimposed manner on the preview image, an object indicating a position at which a perforation is to be applied.

12 Claims, 12 Drawing Sheets

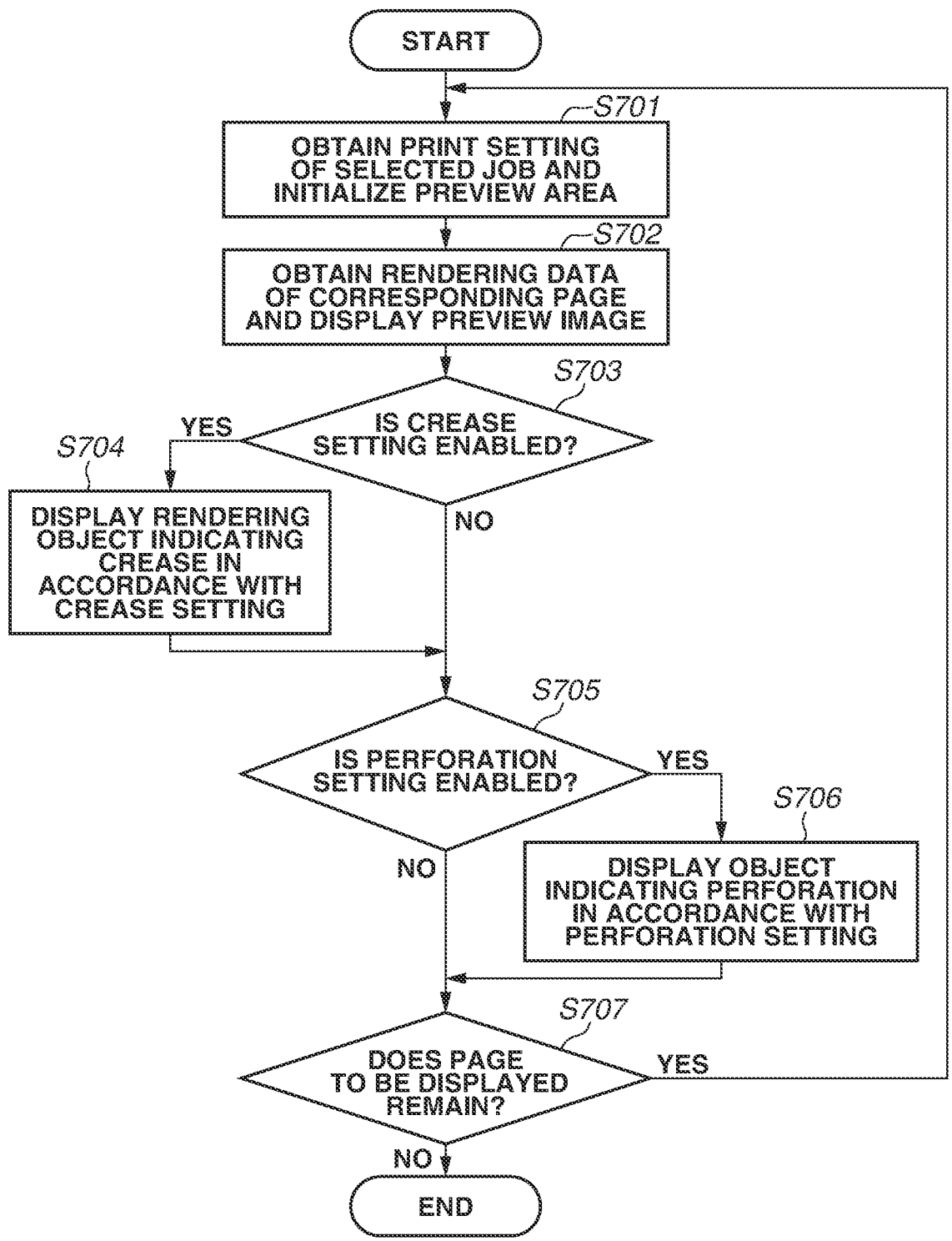

INFORMATION PROCESSING APPARATUS, INFORMATION PROCESSING METHOD, AND STORAGE MEDIUM

BACKGROUND

Field of the Disclosure

The present disclosure relates to an information processing apparatus, an information processing method, and a storage medium.

Description of the Related Art

Some printing systems have a finishing function including a crease processing function and a perforation processing function. In the crease processing, streaks are applied on a printing surface of a sheet using a finisher attached to a printer to enable the sheet to be folded easily. In the perforation processing, perforation lines are provided in a short dashed line manner on a printing surface of a sheet to enable the sheet to be separated easily by hand. Further, some printing systems include a pre-print preview function for a user to check, on a screen, details of print including finishing before printing is performed with a printer. Japanese Patent Application Laid-Open No. 2019-81318 discusses a technique of displaying before printing a set perforation together with an image to be printed, and changing a position of the perforation based on a user's operation, in a printer used to perform printing.

In the technique discussed in Japanese Patent Application Laid-Open No. 2019-81318, the image to be printed and the position of the perforation are displayed on the printer that performs printing, the user cannot grasp before printing the position of the image to be printed and the position of the crease or the perforation on a computer that issues an instruction. Thus, in a case where the printing with the crease processing or the perforation processing is performed, the user has to output a copy as a test printing to check a positional relationship between the print image and the crease or the perforation on an actual print sheet. If a position adjustment is to be performed, the user has to repeat the test printing until the crease or the perforation is applied to a desired position after changing the position of the image or the position of the crease or the perforation.

Through the technique discussed in Japanese Patent Application Laid-Open No. 2019-81318, the position of the perforation is changeable with an operation on the printer, but the position of the image to be printed is not changeable, when the position adjustment between the print image and the perforation is performed. Thus, in a case where the position of the image to be printed is changed, the user has to perform an operation on an application on the computer that generates the image to be printed. As a result, the operation for the position adjustment involves an operation on the printer and an operation on the computer, which is cumbersome and complicated.

SUMMARY

According to an aspect of the present disclosure, an information processing apparatus includes a controller configured to obtain a print setting and image data, cause a display to display on a display unit a preview image for print, the preview image being generated from the obtained image data, and display, in a superimposed manner on the preview image, an object indicating a position at which processing is applied, based on the obtained print setting.

Further features of the present disclosure will become apparent from the following description of exemplary embodiments with reference to the attached drawings.

BRIEF DESCRIPTION OF THE DRAWINGS

FIG. 7 is a flowchart illustrating processing of displaying a preview image.

DESCRIPTION OF THE EMBODIMENTS

Hereinbelow, exemplary embodiments of the present disclosure will be described with reference to the accompanying drawings.

Figure 1:
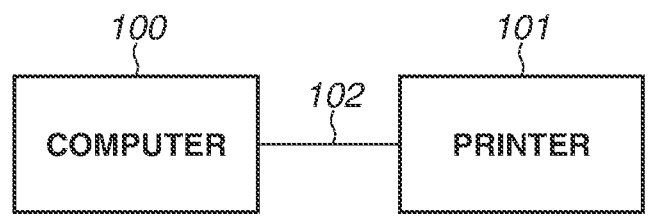
FIG. 1 is a block diagram illustrating a configuration example of a printing system.

FIG. 1 is a block diagram illustrating a configuration example of a printing system according to an exemplary embodiment. As illustrated in FIG. 1, the printing system includes a computer 100 and a printer 101. The computer 100 is connected to the printer 101 via a wired or wireless communication line 102.

The computer 100 is an example of an information processing apparatus. The printer 101 performs printing in response to an instruction from the computer 100.

The printing system may include one or a plurality of the computers 100 and one or a plurality of the printers 101 connected with each other via a network. In the present exemplary embodiment, the main executor that performs processing in the present exemplary embodiment is the computer 100 which is a single information processing apparatus. However, a system including a plurality of apparatuses or a system including a plurality of apparatuses connected with each other via a network may perform the processing in the present exemplary embodiment.

Figure 2:
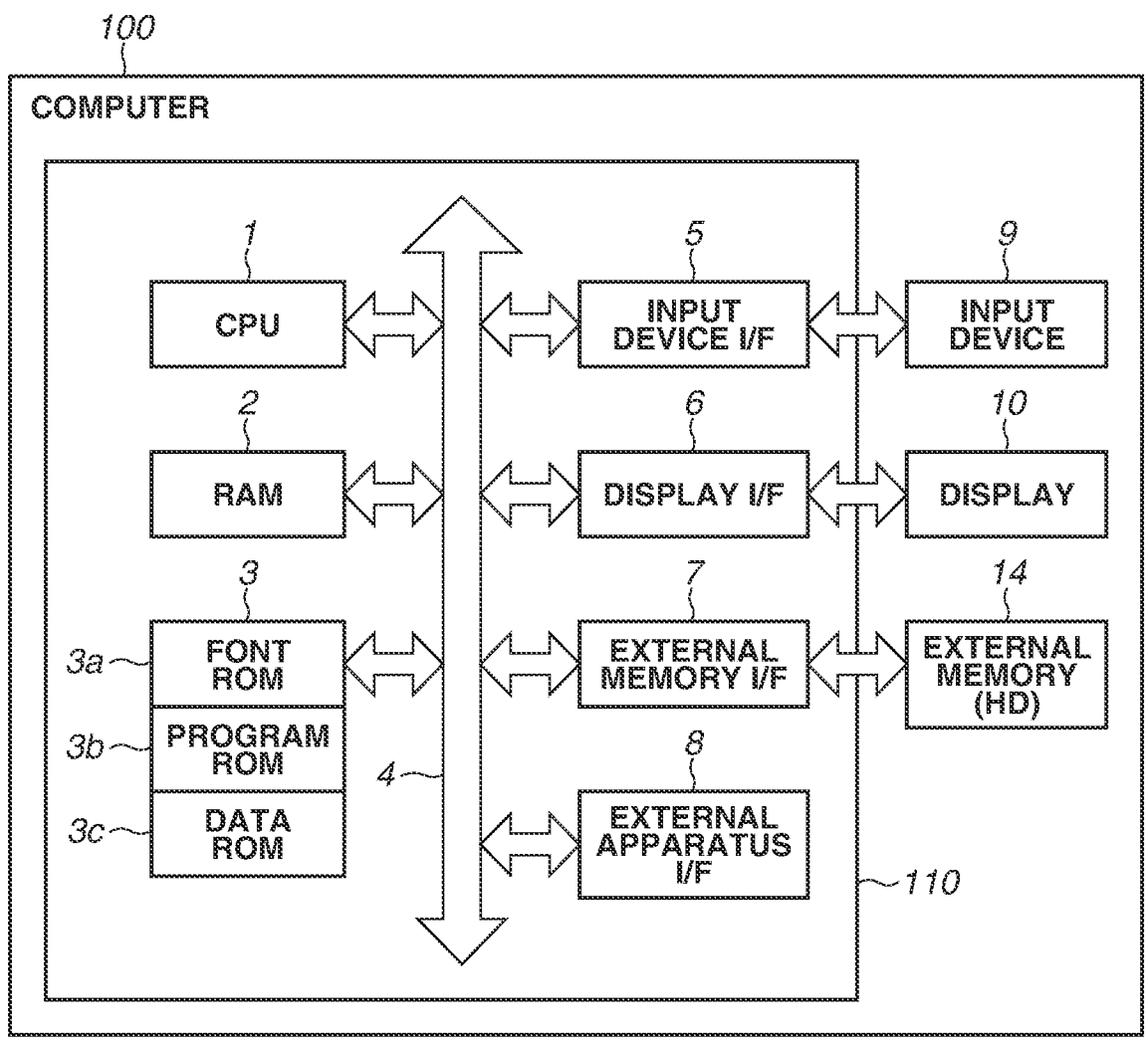
FIG. 2 is a block diagram illustrating a hardware configuration of a computer.

FIG. 2 is a block diagram illustrating a hardware configuration of the computer 100 according to the present exemplary embodiment. The computer 100 includes a controller unit 110. The controller unit 110 includes a central processing unit (CPU) 1, a random access memory (RAM) 2, a read-only memory (ROM) 3, an input device interface (I/F) 5, a display I/F 6, an external memory I/F 7, and an external apparatus I/F 8, which are connected with each other via a system bus 4.

The CPU 1 controls the entire computer 100. The ROM 3 includes a font ROM 3a, a program ROM 3b, and a data ROM 3c. The CPU 1 can read out font information stored in the font ROM 3a and various types of data stored in the data ROM 3c to display them on a display 10. Further, the CPU 1 can load into the RAM 2 and various programs including a basic input and output system (BIOS) stored in the program ROM 3b, and an operating system (OS) and various application programs stored in an external memory 14 and executes them.

An input device 9, such as a keyboard, a mouse, and other devices, for receiving user's operations is connected to the controller unit 110 via the input device I/F 5. The input device 9 functions as an input unit. The display 10 for displaying a processing result to the user is further connected to the controller unit 110 via the display I/F 6. The display 10 functions as a display unit. The external memory 14 is yet further connected to the controller unit 110 via the external memory I/F 7. The external memory 14 is configured of a hard disk (HD) and stores programs, image data, various types of setting information, and the like. The controller unit 110 can be further connected to the communication line 102 or other lines via the external apparatus I/F 8 to communicate with an information processing apparatus such as the printer 101.

The printer 101 includes at least a CPU and a storage unit as a hardware configuration. The function of the printer 101 can be implemented by the CPU executing processing based on programs stored in the storage unit. The printer 101 performs printing of forming an image on a sheet (e.g., paper) medium. Further, the printer 101 includes a finisher for performing post-processing on a sheet with an image printed thereon, such as crease processing for applying a crease on the sheet and perforation processing for applying a perforation on the sheet. The crease processing and the perforation processing will be described in detail below with reference to FIGS. 6A and 6B.

Figure 3:
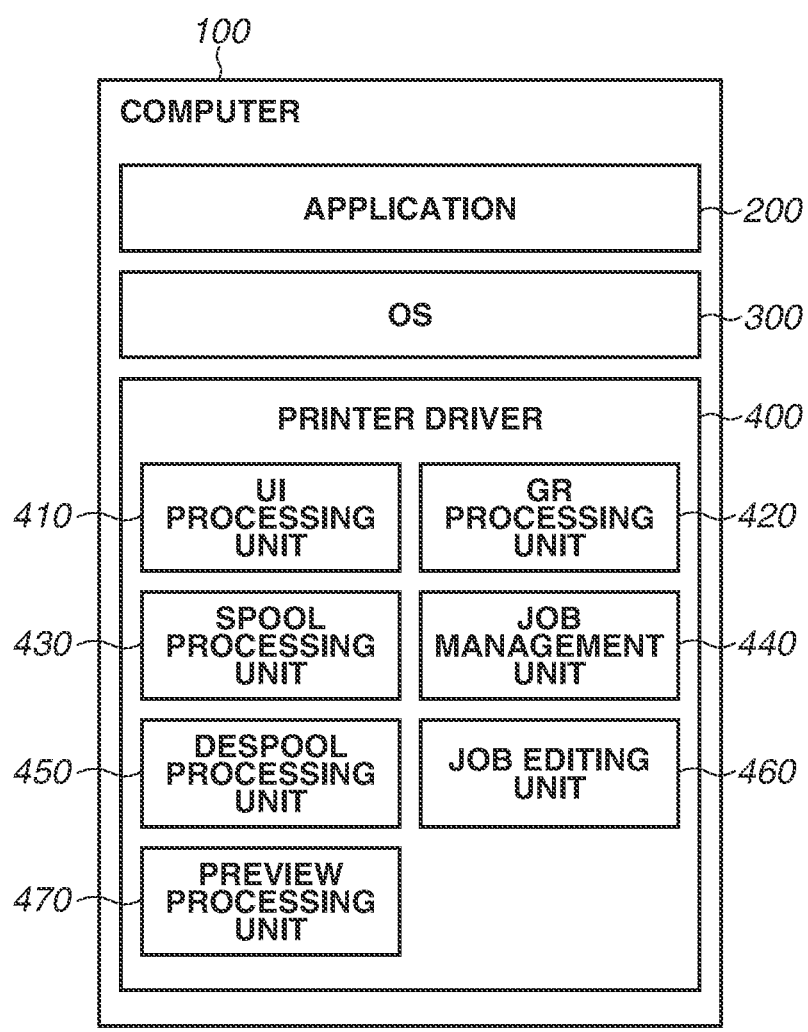
FIG. 3 is a block diagram illustrating a software configuration of the computer.

FIG. 3 is a block diagram illustrating a software configuration of the computer 100 according to the present exemplary embodiment. Functions illustrated in FIG. 3 are implemented by the CPU 1 executing the programs stored in the ROM 3 or the external memory 14.

The software in the computer 100 includes mainly an application 200, an OS 300, and a printer driver 400. The application 200 makes a setting for printing and issues a print instruction, in response to a user's request. The application 200 is document creation software, spreadsheet software, or other software, and has a function of generating rendering data (image data for print). The OS 300 performs a basic control of the computer 100. The printer driver 400 receives the print setting and the print instruction from the application 200 via the OS 300, and processes them. The printer driver 400 includes a user interface (UI) processing unit 410 that generates the print setting, a graphic rendering (GR) processing unit 420 that generates jobs, and a spool processing unit 430 that generates intermediate data. Further, the printer driver 400 includes a job management unit 440 that manages jobs, a despool processing unit 450 that performs print processing based on the intermediate data, a job editing unit 460 that performs job setting change, and a preview processing unit 470 that performs preview processing of jobs.

Figure 4:
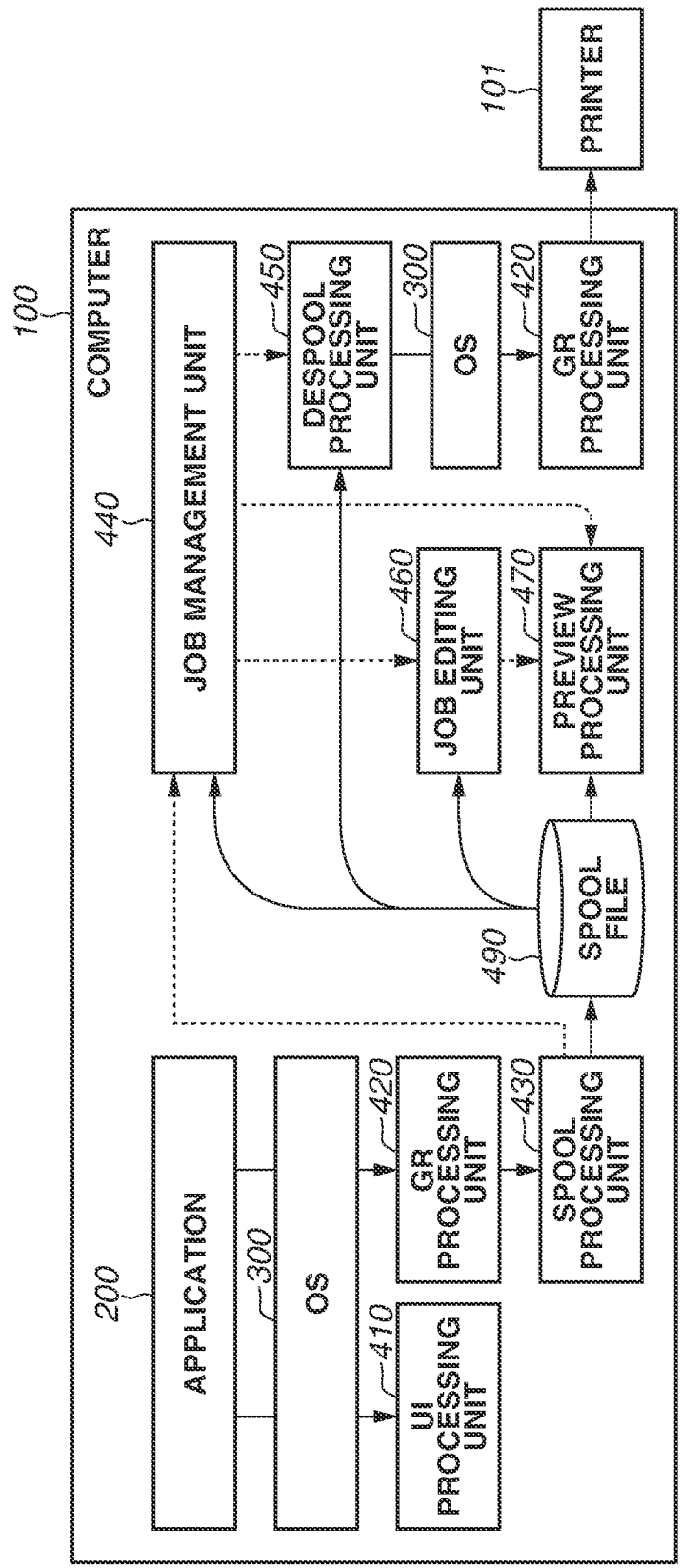
FIG. 4 is a conceptual block diagram illustrating a print processing flow.

Next, with reference to FIG. 4, a print processing according to the present exemplary embodiment will be described. The application 200 calls the UI processing unit 410 of the printer driver 400 via the OS 300 as appropriate to generate a print setting. The application 200 then calls the GR processing unit 420 via the OS 300. The GR processing unit 420 transmits the print setting and the rendering data received from the application 200 to the spool processing unit 430. The spool processing unit 430 converts the print setting and the rendering data received from the GR processing unit 420 into an intermediate data format to hold them as a spool file 490, and activates the job management unit 440 to advance the print processing. The job management unit 440 activated by the spool processing unit 430 displays a job management screen illustrated in FIG. 5A on the display 10. The job management unit 440 manages a spooled job and receives a request for the job from the user using the job management screen.

Figure 5A:
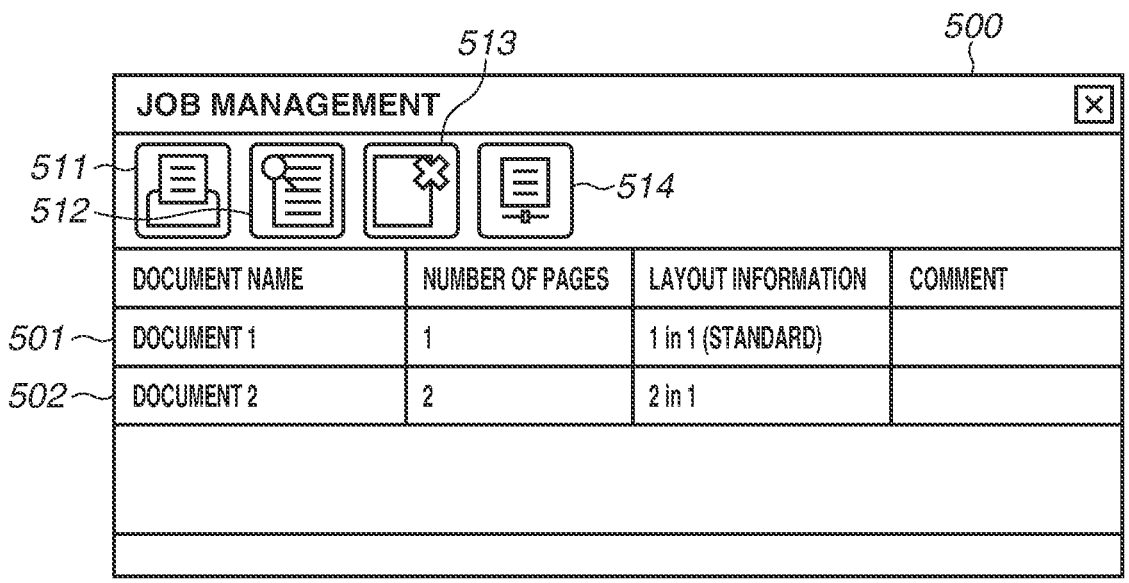
FIGS. 5A, 5B, and 5C are diagrams each illustrating a display example of a screen.

FIG. 5A illustrates an example of a job management screen 500 displayed by the job management unit 440. In the example illustrated in FIG. 5A, two jobs, namely, a document 1 (501) and a document 2 (502), are listed in a selectable manner. For the document 1, "1" is indicated in the field of "number of pages" and "1 in 1" is indicated in the field of "layout". For the document 2, "2" is indicated in in the field of "number of pages" and "2 in 1" is indicated in the field of layout. Four buttons 511 to 514 are provided on the upper part of the job management screen 500, and are, from the left to the right, the print button 511, the preview button 512, the delete button 513, and the setting change button 514. If any one of the buttons is pressed in a state where a job is selected, processing for the selected job is performed.

Initially, processing to be performed in a case where the print button 511 in FIG. 5A is pressed will be described. When the print button 511 is pressed, the job management unit 440 calls the despool processing unit 450. In addition, in a case where the print setting is changed by the job editing unit 460 to be described in detail below, the job management unit 440 transmits the changed print setting to the despool processing unit 450. The called despool processing unit 450 transmits rendering data of the spool file 490 of the selected job to the GR processing unit 420 via the OS 300, in accordance with the print setting included in the spool file 490 or the print setting transmitted from the job management unit 440. The GR processing unit 420 converts the rendering data received via the OS 300 into data in a format processable by the printer 101, without calling the spool processing unit 430 as described above, and transmits the converted data to the printer 101 as print data. The printer 101 performs printing based on the print data received from the computer 100.

Next, processing to be performed in a case where the preview button 512 in FIG. 5A is pressed will be described.

When the preview button 512 is pressed, the job management unit 440 calls the preview processing unit 470. The called preview processing unit 470 refers to the rendering data of the spool file 490 of the selected job, generates a preview image from the rendering data, and displays the generated preview image on the display 10.

Figure 5B:
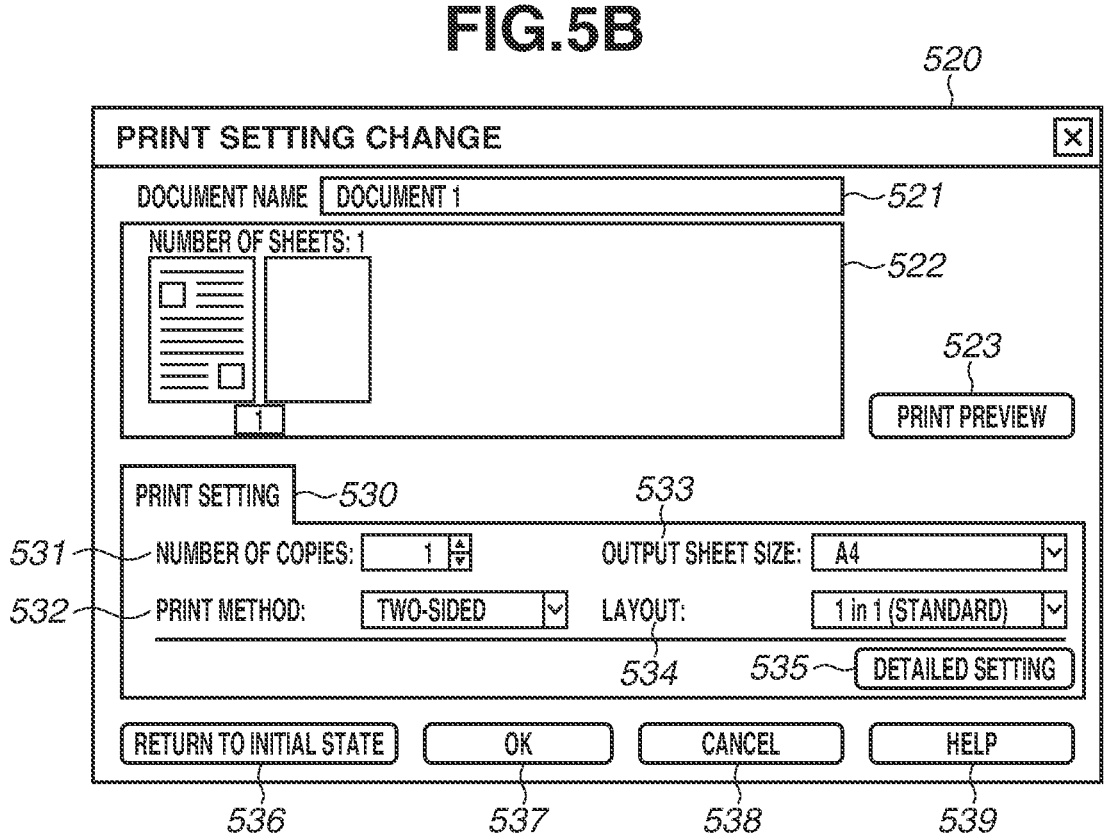
Figure 5C:
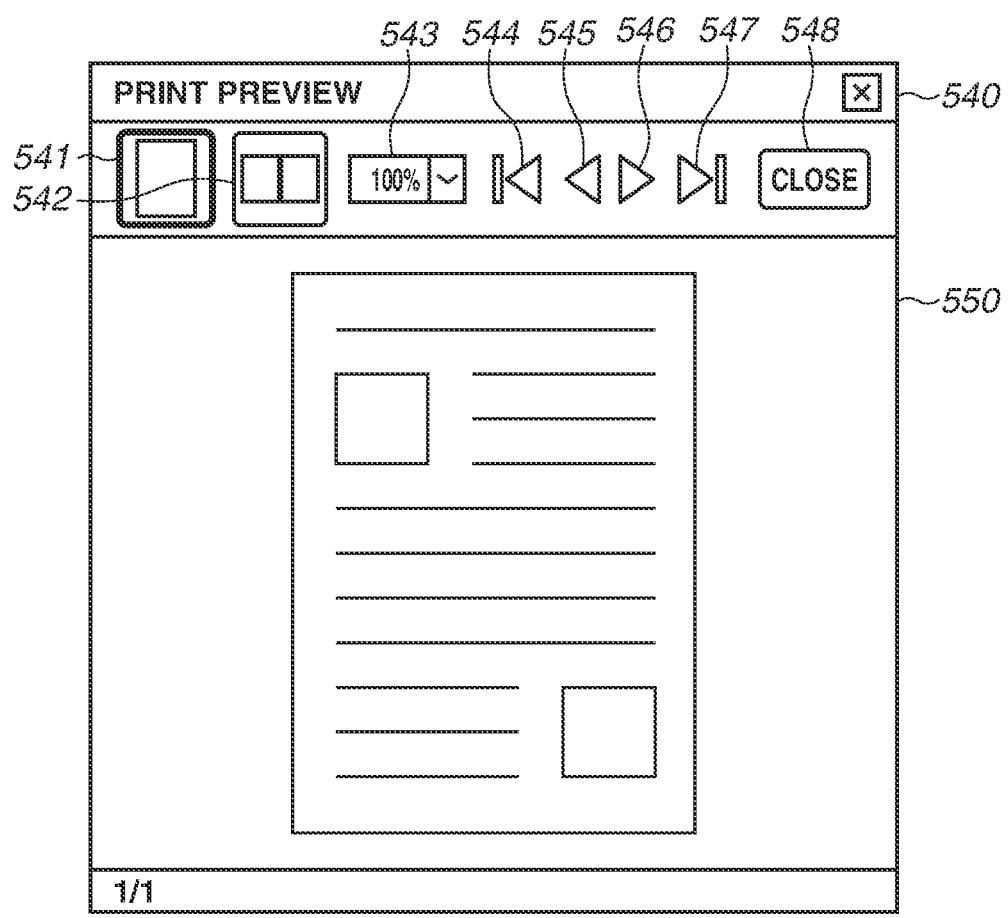

FIG. 5C illustrates an example of a preview screen 540 displayed by the preview processing unit 470. The preview screen 540 includes an operation area including operation buttons 541 to 548, and a preview area 550 for displaying a preview image. The operation button 541 is used for selecting a one-page display mode in which only one page is displayed in the preview area 550.

The operation button 542 is used for selecting a two-page display mode in which continuous two pages are displayed in the preview area 550. In the example illustrated in FIG. 5C, the one-page display mode is selected. The operation button 543 is used in a case where a preview image in the preview area 550 is to be enlarged or reduced. The operation buttons 544 to 547 are used for bringing the page to be displayed in the preview area 550 forward or backward. The operation button 548 is used for closing the preview screen 540.

Next, processing to be performed in a case where the delete button 513 in FIG. 5A is pressed will be described. In response to the delete button 513 being pressed, the job management unit 440 deletes the selected job from the list, and performs processing related to the deletion of the job, such as a deletion of the spool file 490 corresponding to the job.

Next, processing to be performed in a case where the setting change button 514 in FIG. 5A is pressed will be described. In response to the setting change button 514 being pressed, the job management unit 440 calls the job editing unit 460. The called job editing unit 460 displays on the display 10 a job editing screen 520 illustrated in FIG. 5B. The job editing unit 460 receives from the user a print setting change regarding the job selected using the job management screen 500.

FIG. 5B illustrates an example of the job editing screen 520 displayed by the job editing unit 460. The job editing screen 520 is provided with a display area 521 and a small preview area 522. The display area 521 displays a name of the selected job (document name), and the small preview area 522 displays a whole image of the rendering data of the job in reduced size. The image to be displayed on the small preview area 522 is generated with reference to the rendering data of the spool file 490, as in the processing by the preview processing unit 470 described above. The job editing screen 520 is provided with a preview button 523. In a case where the preview button 523 is pressed, the detailed preview screen 540 generated by the preview processing unit 470 can be displayed.

Further, the job editing screen 520 is provided with a print setting tab 530. The print setting tab 530 displays current settings and controls for changing the settings with the user's operation for each print setting item. Examples of the print setting items include a "number of copies" 531, a "print method" 532, such as one-sided/two-sided, an "output sheet size" 533, and a "layout" 534, such as "1 in 1"/"2 in 1". When a detail setting button 535 is pressed, the job editing unit 460 calls the UI processing unit 410. The called UI processing unit 410 displays a print setting screen (not illustrated) on the display 10. The print setting screen displayed by the UI processing unit 410 enables the user to check and change the current settings of other items that are not provided in the print setting tab 530. For example, it is possible to check and change the settings regarding the crease processing or the perforation processing. The job editing screen 520 is provided with an initialization button 536, an OK button 537, a cancel button 538, and a help button 539. The initialization button 536 is used to return the settings to the initial state, the OK button 537 is used to determine the changed settings and close the screen display, and the cancel button 538 is used to discard the changed settings and close the screen display. In a case where a print setting is changed on the job editing screen 520, the changed print setting is transmitted to the job management unit 440, and then the changed print setting is reflected on the printing and the preview screen 540 thereafter.

Figure 6A:
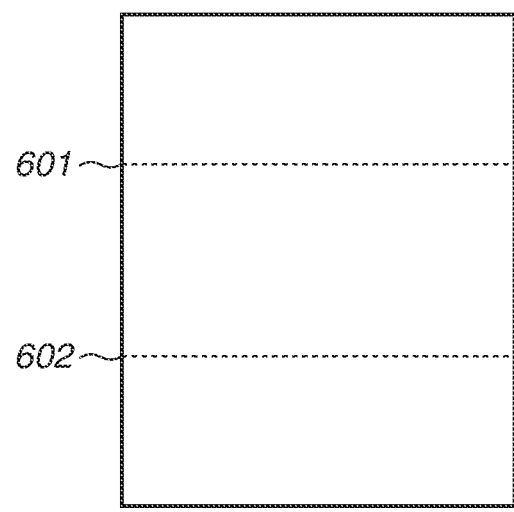
FIGS. 6A and 6B are diagrams respectively illustrating crease processing and perforation processing.
Figure 6B:
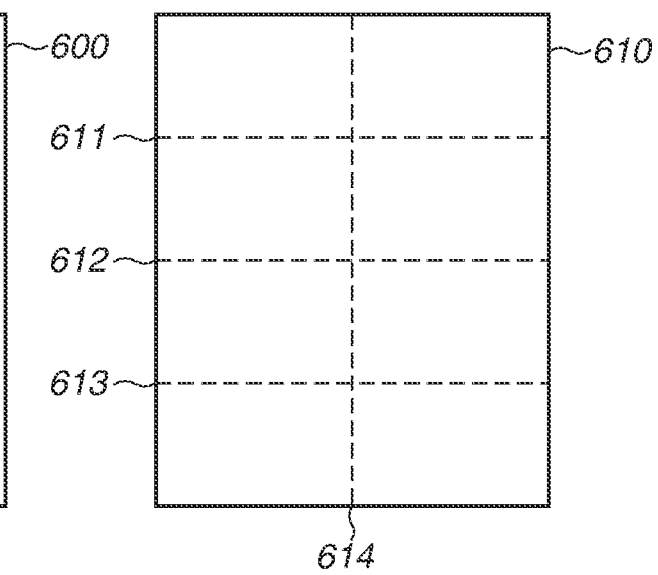

The crease processing and the perforation processing to be performed by the finisher of the printer 101 will now be described. FIGS. 6A and 6B are diagrams respectively illustrating the crease processing and the perforation processing.

Initially, the crease processing will be described with reference to FIG. 6A. In the crease processing, a blade for crease is pressed at a predetermined position of the sheet to apply a streak to enable a sheet to be easily foldable. With the crease processing, it is possible to apply a plurality of creases 601 and 602 on a sheet 600 as illustrated in FIG. 6A. The portions with the creases applied are depressed to be thinner than the other portions. Thus, the portions with the creases applied can be easily folded. In addition, the sheet is folded in such a manner that the crease processed surface of the sheet that has been subjected to the crease processing is to be a mountain-fold side (orientating upward), and the crease non-processed surface of the sheet that has not been subjected to the crease processing is to be a valley-fold side (orientating downward).

Next, the perforation processing will be described with reference to FIG. 6B. In the perforation processing, cut-lines are applied in a short dashed line manner in the sheet to enable the sheet to be easily detached by hand. With the perforation processing, it is possible to apply a plurality of perforations 611 to 614 to a sheet 610, for example, in a horizontal direction and a vertical direction as illustrated in FIG. 6B. Adjusting the positions and the shapes of the perforations enables the sheets after detachment with desired sizes and shapes.

FIG. 7 is a flowchart illustrating processing of displaying a preview image for print according to the present exemplary embodiment. The processing of this flowchart is implemented by the CPU 1 loading a program stored in the ROM 3 or other storages into the RAM 2 and executing it.

When the preview button 512 in FIG. 5A or the preview button 523 in FIG. 5B is pressed, in step S701, the preview processing unit 470 obtains a print setting of the selected job, and initializes the preview area 550. The print setting is normally obtained from the spool file 490, but in a case where the print setting is changed by the job editing unit 460, the print setting is obtained from the job management unit 440. The print setting includes a setting about enabling or disabling of the crease processing (hereinbelow, referred to as a crease setting) and the perforation processing (hereinbelow, referred to as a perforation setting), and detailed setting information about creases and/or perforations.

Next, in step S702, the preview processing unit 470 obtains the rendering data of the corresponding page from the spool file 490 of the selected job. A preview image is generated by using a graphics engine of the OS 300 or the like as appropriate based on the obtained rendering data to display the generated preview image on the preview area 550 of the preview screen 540. In the present exemplary embodiment, the preview processing unit 470 functions as an obtaining unit and a display control unit.

Next in step S703, the preview processing unit 470 determines whether the crease setting is enabled with reference to the print setting obtained in step S701. If the preview processing unit 470 determines that the crease setting is enabled (YES in step S703), the processing proceeds to step S704. If the preview processing unit 470 determines that the crease setting is not enabled (NO in step S703), the processing proceeds to step S705.

In step S704, the preview processing unit 470 reads an object indicating a crease from the data ROM 3c in accordance with the crease setting, and displays, in a superimposed manner on the preview image generated in step S702, the read object at a position corresponding to a position at which the crease is to be applied on a crease processing surface.

Figure 8A:
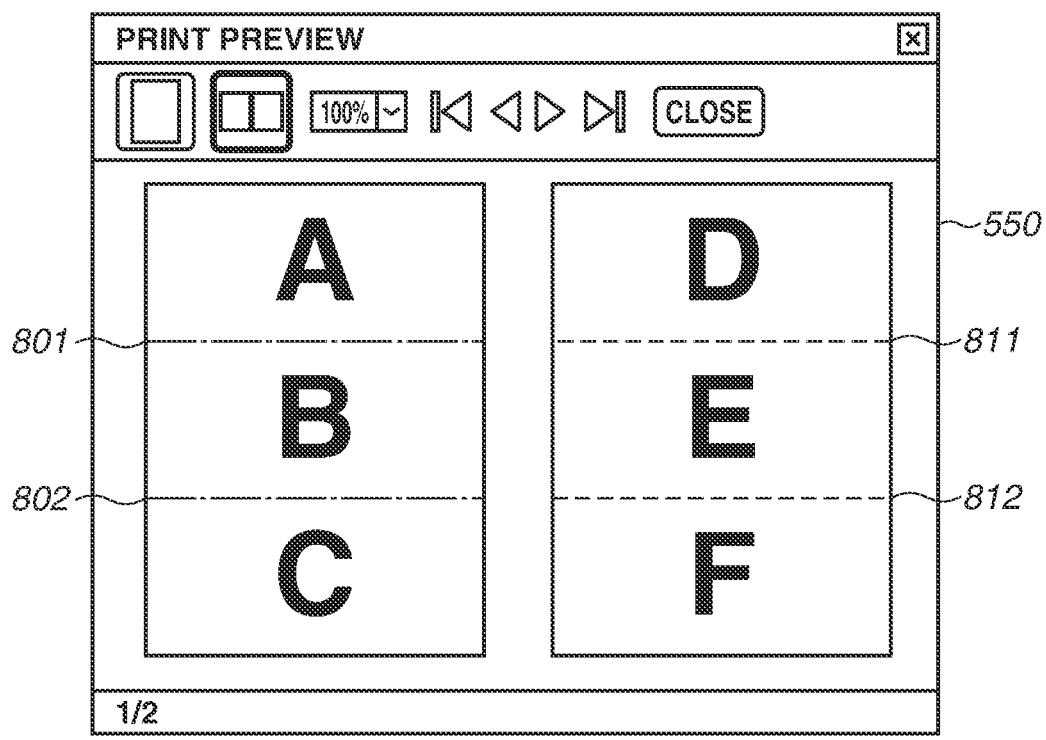
FIGS. 8A and 8B are diagrams each illustrating a display example of a preview screen.

FIG. 8A illustrates a display example of objects indicating the creases on the preview screen 540. FIG. 8A illustrates an example of displaying a preview image of a two-sided printing output in a two-page display mode. On the left side in FIG. 8A, a preview image of a first page (front surface in two-sided printing) on which three letters of "A", "B", and "C" are arranged at equal intervals is displayed. Further, on the right side in FIG. 8A, a preview image of a second page (back surface in two-sided printing) on which three letters of "D", "E", and "F" are arranged at equal intervals is displayed. In addition, the print setting includes a crease setting of applying two creases on the front surface of the sheet in a horizontal direction.

With reference to the crease setting, the preview processing unit 470 displays, in a superimposed manner on the preview image, first objects 801 and 802 at positions at which the respective creases are to be applied on the preview image of the first page, which is a crease processing surface. In the example in FIG. 8A, the first objects 801 and 802 are dashed-dotted lines. In the actual print product, a streak is applied over the print image on the processing surface side, which affects the print image. Thus, an object not having light transmission property is used on the crease processing surface. In this way, a preview image on which the influence by the crease processing is reflected can be displayed.

Further, as for a preview image of the second page serving as the crease non-processing surface, the preview processing unit 470 displays, in a superimposed manner on the preview image, second objects 811 and 812 indicating the crease processing at positions corresponding to the creases on the crease processing surface. In the example in FIG. 8A, the second objects 811 and 812 are dashed lines. In this way, a preview image that allows users to recognize folding (valley fold) positions can be provided even on a crease non-processing surface, by display of the objects at positions corresponding to the creases. In the actual print product, the print image on the crease non-processing surface is less affected by the crease processing. Thus, objects with light transmission property are used on the crease non-processing surface. In this way, a preview image on which the influence by the crease processing is small is reflected is providable.

As described above, the preview processing unit 470 differentiates the object indicating the crease processing depending on whether the surface corresponds to the crease processing surface or the crease non-processing surface. In this way, users can easily recognize, when the preview image is displayed, the positions at which the mountain fold streaks are to be applied and the positions at which the valley fold streaks are to be applied. The method of differentiating the object is not limited to the method illustrated in FIG. 8A, and the method is not specifically limited as long as the objects on the crease processing surface is displayable in more emphasized manner than the objects on the crease non-processing surface. The preview processing unit 470 expresses whether the object is on the crease processing surface with line types (e.g., dotted line, broken line, bold line, and thin line), colors, light transmittancies, or combinations thereof.

Figure 9:
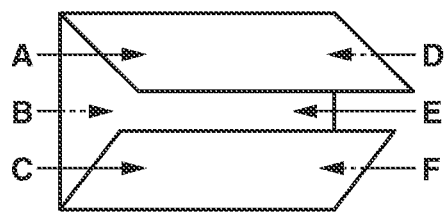
FIG. 9 is a diagram illustrating a print product in a folded state that have been subjected to the crease processing.

FIG. 9 is a diagram illustrating a state where the print product obtained from the preview image in FIG. 8A is actually folded at the positions of the crease processing. FIG. 9 illustrates on which block surface of the folded print product each of the letters of "A", "B", "C", "D", "E", and "F" is arranged. In the example illustrated in FIG. 9, the crease processing of applying two creases on the front surface of the sheet is performed, so that two mountain-fold streaks are formed on the front surface, which is referred to as "inside threefold".

Referring back to FIG. 7, in step S705, with reference to the print setting obtained in step S701, the preview processing unit 470 determines whether a perforation setting is enabled. If the preview processing unit 470 determines that the perforation setting is enabled (YES in step S705), the processing proceeds to step S706. If the preview processing unit 470 determines that the perforation setting is not enabled (NO in step S705), the processing proceeds to step S707.

In step S706, the preview processing unit 470 reads from the data ROM 3c the objects indicating the perforation processing in accordance with the perforation setting, and displays the read objects at positions, on the preview image generated in step S702, corresponding to the positions at which the perforation processing is to be applied on the perforation processing surface.

Figure 8B:
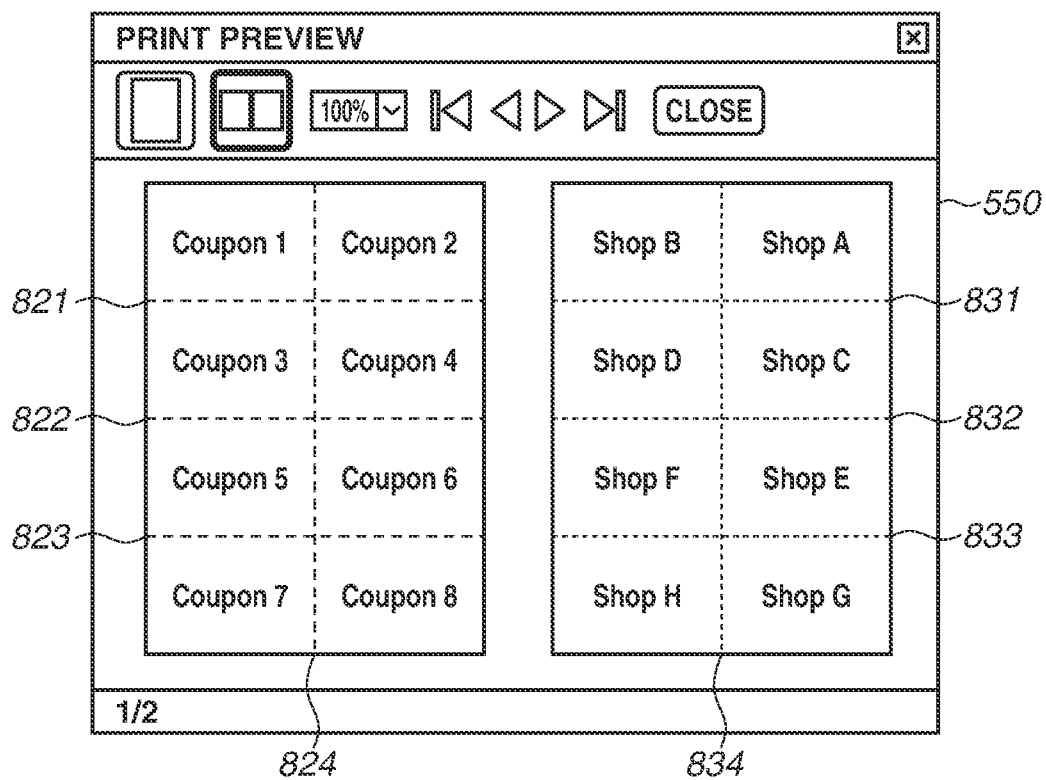

FIG. 8B illustrates a display example of the objects indicating the perforations on the preview screen 540. FIG. 8B illustrates an example of displaying a two-sided printing sheet in a two-page display mode. On the left side in FIG. 8B, a preview image of a first page (front surface of pages for two-sided printing) in which character strings of Coupon 1 to Coupon 8 are arranged in a matrix of 4 rows and 2 columns. Further, on the right side in FIG. 8B, a preview image of a second page (back surface of the pages for two-sided printing) in which character strings of Shop A to Shop H arranged in a matrix of 4 rows and 2 columns is displayed. Further, in this display examples, the print setting includes a perforation setting of applying three perforations in a horizontal direction and one perforation in a vertical direction on the frond surface of the sheet.

The preview processing unit 470 displays, in a superimposed manner, third objects 821 to 824 indicating perforations at positions, on the preview image of the first page serving as a perforation processing surface, corresponding to the positions at which the perforations are to be performed on the perforation processing surface, with reference to the perforation setting. In the example in FIG. 8B, the third objects 821 to 824 are broken lines having interval spaces shorter than the second objects 811 and 812.

The preview processing unit 470 further displays, in a superimposed manner, fourth objects 831 to 834 indicating perforations at positions corresponding to the perforations on the perforation processing surface for a preview image of the second page serving as the perforation non-processing surface that is a surface on which the perforation processing is not to be performed. In the example in FIG. 8B, the fourth objects 831 to 834 are broken lines having interval spaces even shorter than the third objects 821 to 824. As in the case of the crease processing, a preview image that allows users to recognize the perforation positions is providable even on the perforation non-processing surface, by displaying the objects at positions corresponding to the perforations.

In the actual print product, small holes are to be bored in the sheet in the case of the perforation processing, so that print images on both of the processing surface and non-processing surface are affected. Thus, objects having no light transmission property are used on both of the perforation processing surface and the perforation non-processing surface. In this way, a preview image on which the influence by the perforation processing is reflected is providable. Further, as in the case of the crease processing, the preview processing unit 470 differentiates the object indicating the perforation processing depending on whether the target page corresponds to the perforation processing surface or the perforation non-processing surface. In this way, the user can easily recognize, when the preview image is displayed, whether the target page corresponds to a perforation processing surface or a perforation non-processing surface.

Referring back to FIG. 7, in step S707, the preview processing unit 470 determines whether there remains another page of which a preview image is to be displayed. In the case of the two-page display mode as illustrated in FIGS. 8A and 8B, a preview image of the second page is to be displayed after the display of the preview image of the first page is ended. If the preview processing unit 470 determines that there remains a page of which a preview image is to be displayed (YES in step S707), the processing returns to step S701 to repeat the processing again from step S701 while setting the next page to a target page. In step S707, if the preview processing unit 470 determines that the display of preview images of all the pages to be displayed are completed (NO in step S707), a series of the processes is ended.

Figure 10:
FIG. 10 is a table illustrating examples of items indicating the crease processing or the perforation processing.

In the above descriptions, each of the objects indicating the crease processing or the perforation processing is the object having the line shape along the position at which the corresponding processing is to be performed, and is displayed using a different line type depending on the type of the processing (crease processing or perforation processing) and whether the surface is the processing surface or the non-processing surface. With the above-described method, there may be a case where a user cannot easily determine, even if the user sees the object indicating the crease processing or the perforation processing, the type of the processing indicated by the object, or whether the target surface is the processing surface or the non-processing surface. Thus, the preview processing unit 470 displays items and tooltips as illustrated in FIG. 10 using an event transmitted from the OS 300, in a case where the point of a mouse operated by a user is positioned at or in proximity to the display position of the object on the preview screen 540. The preview processing unit 470 may display, together with the objects indicating the crease processing or the perforation processing, items illustrated in FIG. 10 at the positions, on the preview image, corresponding to the positions, on the sheet, at which the crease processing or the perforation processing is to be applied, when the preview image is displayed. Data indicating items and tooltips illustrated in FIG. 10 is stored in the ROM 3, and the preview processing unit 470 reads the data from the ROM 3 as appropriate and uses the read data, depending on the type of the processing and whether the target surface is the processing surface or the non-processing surface.

FIG. 10 is a diagram illustrating examples of the items and the tooltips. The preview processing unit 470 displays, in a superimposed manner on the preview image, items reflecting the folding at the crease, together with the objects of the broken lines and the dotted lines indicating the crease processing. In particular, the preview processing unit 470 displays items with the mountain fold lines emphasized on the crease processing surface, and items with the valley fold lines emphasized on the crease non-processing surface. Further, the preview processing unit 470 displays items with the folding direction (vertical folding or horizontal folding) thereof changed depending on the crease direction (vertical direction or horizontal direction). The use of such items enables the user to recognize at first sight whether the folding is the mountain fold or the valley fold, or the vertical fold or the horizontal fold. This enables the user to easily imagine the print product in the folded state.

The preview processing unit 470 displays, in a superimposed manner on the preview image, items reflecting the separations along the perforations, together with the objects of the dotted lines indicating the perforation processing, also in the case of the perforation. The items are differentiated depending on whether the target surface is the processing surface or the non-processing surface, and the direction of the perforations (vertical direction or horizontal direction). The use of such items facilitates the user's grasping of the details of the perforation processing.

The preview processing unit 470 further displays, in a case where a mouse pointer is positioned at or in proximity to the object indicating the crease processing or the perforation processing, a character area indicating the type of the processing, whether the target surface is the processing surface or the non-processing surface, using characters as tool tips. In this manner, displaying the items and the tooltips makes it possible to easily inform the users of the information about the type of the processing or whether the target surface is the processing surface or the non-processing surface.

The function of performing the preview of the perforation processing will now be described. In the case of the perforation processing, the state of the print product before being detached can be expressed in the preview image of the whole page as illustrated in FIG. 8B, but the state of the print product after being detached cannot be expressed. Thus, in the case of the perforation processing, a perforation division preview mode is additionally provided. In this mode, a preview image is generated and displayed for each piece of a page to be obtained through detachment along the perforations.

Figure 11:
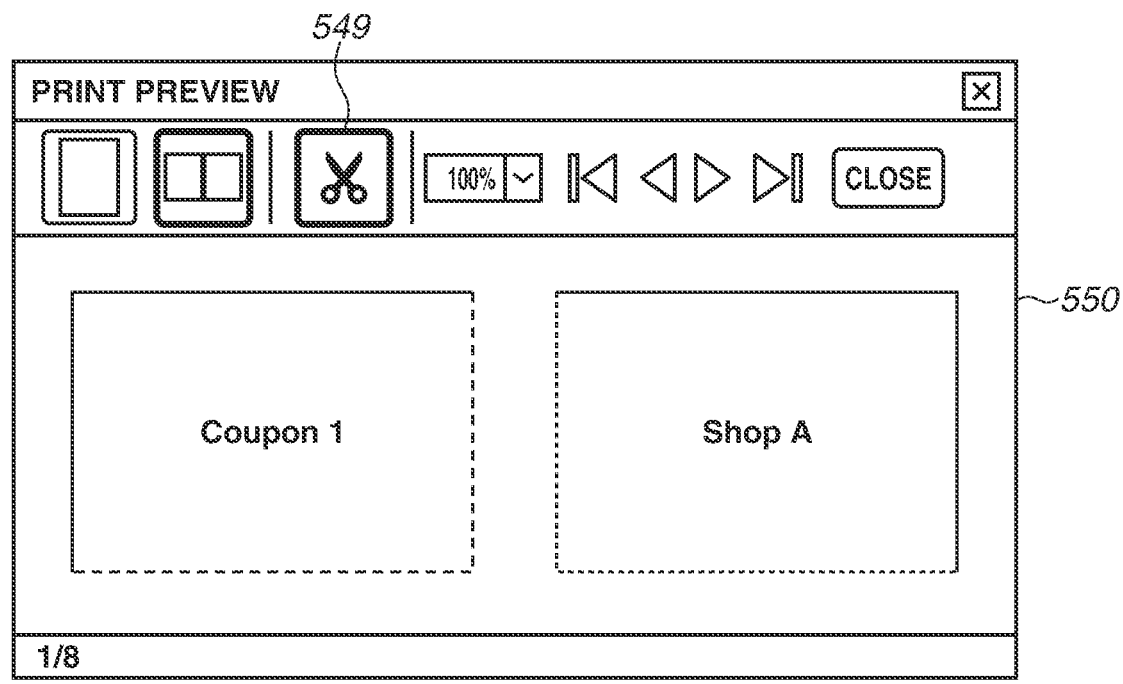
FIG. 11 is a diagram illustrating a display example of a preview screen.

FIG. 11 illustrates an example display in a case where the perforation division preview mode is selected in the state illustrated in FIG. 8B. In a case where the perforation processing is included in the print setting, the preview processing unit 470 displays a perforation division preview mode button 549 in the operation area of the preview screen 540. In a case where a user presses the perforation division preview mode button 549, the preview processing unit 470 generates and displays a preview image in a piece unit of a page to be obtained through detachment along the lines of the perforation processing in step S702 in FIG. 7, not in a page unit. In step S707 in FIG. 7, the preview processing unit 470 determines whether a piece of the page to be displayed as the preview image remains. The preview processing unit 470 controls, in a case of the two-sided printing, the order of the preview display, specifically, from a front side to a back side for each piece.

Providing of such a perforation division preview mode makes it possible to display on the computer 100 the independent preview image for each piece of a page to be obtained through detachment along the perforations before issuance of a print instruction. This enables the user to check the image of the state of the pieces of page to be obtained through detachment along the perforations that is to be provided to end users, thus improving the usability for the user.

The exemplary embodiments described above enables the user to accurately check the positional relationship between the print image and the creases or the perforations on the preview screen 540 displayed on the computer 100, thus eliminating the need for the user to perform unnecessary test printing. In a case where the position adjustment of the print image is to be performed, it is possible to change the arrangement of the characters and the like in the rendering data by calling the application 200. Further, in a case where the position adjustment of the creases or the perforations is to be performed, it is possible to perform an operation of changing the setting of the crease processing or the perforation processing by using the print setting screen of the UI processing unit 410. In such a manner, the position adjustment of the print image and the position adjustment of the creases and/or the perforations are performable on the computer 100, which enables the user to efficiently perform an operation of the position adjustment. Furthermore, operations of checking and/or adjusting the positions does not involve operations on the printer 101, which enables the user to perform operations of checking the image and adjusting the position without caring other users' operations even if the printer 101 is shared by the other users.

While the present disclosure has been described with reference to the exemplary embodiments, the above-described exemplary embodiments are merely examples to embody the present disclosure and shall not be construed as limiting the technical range of the present disclosure. Thus, the present disclosure can be realized in diverse ways so long as it is in accordance with the technological thought or main features of the present disclosure.

Other Exemplary Embodiments

According to the enabled disclosure, it is possible to improve the convenience of the users when printing including the crease processing or the perforation processing is performed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-172950, filed Oct. 22, 2021, which is hereby incorporated by reference herein in its entirety.

What is claimed is:

1. An information processing apparatus comprising:
a controller configured to
obtain image data and a print setting related to a creasing function,
generate a first preview image for print based on the obtained image data and the print setting, wherein a first object indicating a mountain fold is added to the first preview image;
generate a second preview image for print based on the obtained image data and the setting value, wherein a second object indicating a valley fold is added to the second preview image;
cause a display of the information processing apparatus to display the first preview image and the second preview image,
wherein one side of a recording medium corresponding to the first preview image is a processing surface and another side of the recording medium corresponding to the second preview image is a non-processing surface, and
wherein the controller causes the display to display the first object with no transmission property on the first preview image of the processing surface and causes the display to display the second object with transmission property on the second preview image of the non-processing surface.

2. The information processing apparatus according to claim 1,
wherein the first object has a line shape along a position corresponding to a position at which a processing is to be applied on the processing surface, and
wherein the second object is different from the first object in at least one of a type, a color, and a transmittancy.

3. The information processing apparatus according to claim 1, wherein, in a case where an operation is performed at or in proximity to a display position of the first object or the second object, the controller causes the display to display an item indicating whether a preview image is the first preview image or the second preview image.

4. The information processing apparatus according to claim 1, wherein, in a case where an operation is performed at or in proximity to a display position of the first object, the controller causes the display to display, in a superimposed manner on the first preview image, a character area for expressing a type of the processing, using characters.

5. A non-transitory storage medium storing a method for controlling an information processing apparatus, the method comprising:
obtaining image data and a print setting related to a creasing function, and
generating a first preview image for print based on the obtained image data and the print setting, wherein a first object indicating a mountain fold is added to the first preview image;
generating a second preview image for print based on the obtained image data and the setting value, wherein a second object indicating a valley fold is added to the second preview image; and
performing display of the information processing apparatus control so that the first preview image and the second preview image,
wherein one side of a recording medium corresponding to the first preview image is a processing surface and another side of the recording medium corresponding to the second preview image is a non-processing surface, and
wherein the controller causes the display to display the first object with no transmission property on the first preview image of the processing surface and causes the display to display the second object with transmission property on the second preview image of the non-processing surface.

6. The non-transitory storage medium according to claim 5, wherein the first preview image is corresponding to a first image printed on one side of a recording medium and the second preview image is corresponding to a second image printed on another side of the recording medium.

7. The non-transitory storage medium according to claim 5, wherein the first object has a line shape along a position corresponding to a position at which a processing is to be applied on the processing surface, and
wherein the second object is different from the first object in at least one of a type, a color, and a transmittancy.

8. The non-transitory storage medium according to claim 5, the method further comprising:
in a case where an operation is performed at or in proximity to a display position of the first object or the second object, causing the display to display an item indicating whether a preview image is the first preview image or the second preview image.

9. A control method for controlling an information processing apparatus, the control method comprising:
obtaining image data and a print setting related to a creasing function,
generating a first preview image for print based on the obtained image data and the setting value, wherein a first object indicating a mountain fold is added to the first preview image;
generating a second preview image for print based on the obtained image data and the setting value, wherein a second object indicating a valley fold is added to the second preview image; and
causing a display of the information processing apparatus to display the first preview image and the second preview image.

10. The control method according to claim 9, wherein the first preview image is corresponding to a first image printed on one side of a recording medium and the second preview image is corresponding to a second image printed on another side of the recording medium.

11. The control method according to claim 10, the control method further comprising:
in a case where an operation is performed at or in proximity to a display position of the first object or the second object, the controller causes the display to display an item indicating whether a preview image is the first preview image or the second preview image.

12. The control method according to claim 9,
wherein the first object has a line shape along a position corresponding to a position at which a processing is to be applied on the processing surface, and
wherein the second object is different from the first object in at least one of a type, a color, and a transmittancy.

* * * * *